United States Patent [19]

Reinicke et al.

[11] 4,309,022

[45] Jan. 5, 1982

[54] POPPET VALVE ACTUATOR APPARATUS

[75] Inventors: Robert H. Reinicke, Mission Viejo; Henry A. Waller, Woodland Hills, both of Calif.

[73] Assignee: Consolidated Controls Corporation, El Segundo, Calif.

[21] Appl. No.: 139,961

[22] Filed: Apr. 14, 1980

[51] Int. Cl.³ .................. F16K 31/126; F16K 31/122
[52] U.S. Cl. .................. 251/61.4; 251/63.4; 251/63.6; 251/73; 251/80; 251/297; 74/531
[58] Field of Search ............... 251/61.2, 61.4, 61.5, 251/63.4, 63.5, 63.6, 77, 79, 80, 297, 335 B, 74, 81; 74/527, 531

[56] References Cited

U.S. PATENT DOCUMENTS

| | | | |
|---|---|---|---|
| 2,733,729 | 2/1956 | Wolfe | 251/297 |
| 3,040,772 | 6/1962 | Todd | 251/73 |
| 3,874,629 | 4/1975 | Fontaine | 251/61.4 |
| 4,073,466 | 2/1978 | Snyder | 251/63.4 |
| 4,074,688 | 2/1978 | Snyder | 251/63.4 |
| 4,098,487 | 7/1978 | Bauer | 251/61.4 |
| 4,248,188 | 2/1981 | Wilson et al. | 251/61.4 |

*Primary Examiner*—Martin P. Schwadron
*Assistant Examiner*—G. L. Walton
*Attorney, Agent, or Firm*—Mason, Kolehmainen, Rathburn & Wyss

[57] ABSTRACT

A poppet valve actuating apparatus includes an actuator for driving a valve poppet closed with substantial but momentary force to effect tight valve shutoff. After driving the poppet closed with a momentarily-applied relatively high-value force, the actuator then automatically reduces the poppet seating or holding force for maintaining the value in the closed position by automatic release of an integral detent coupling that applies a lower-value auxiliary spring holding force after the poppet is seated. The reduced value holding force prevents cold flow of the poppet material during extended periods wherein the poppet is in a closed position.

17 Claims, 4 Drawing Figures

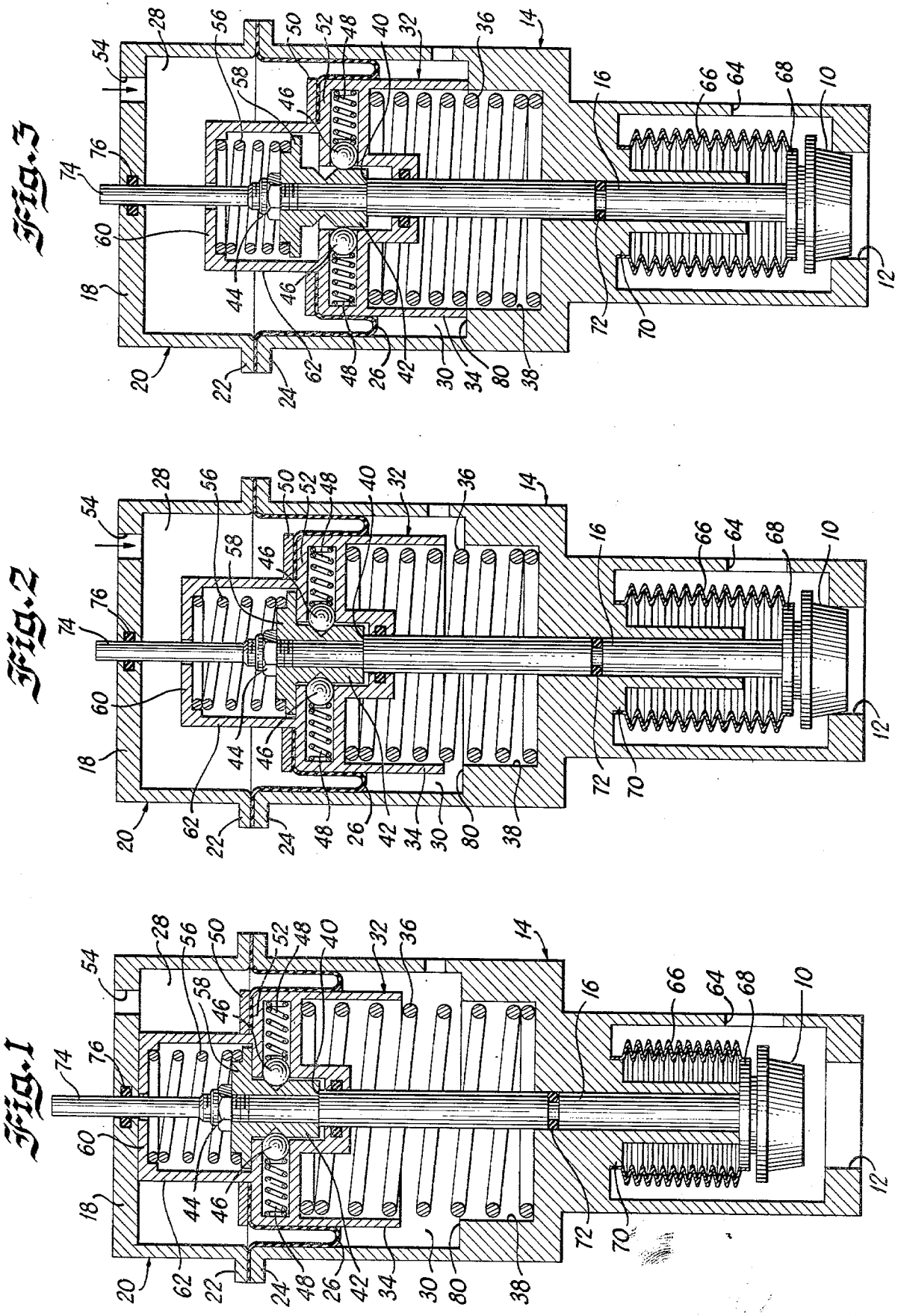

POPPET VALVE ACTUATOR APPARATUS

BACKGROUND OF THE INVENTION

1. Field of the Invention

The present invention relates to a poppet valve actuator apparatus for opening and/or closing valves of various types, and more particularly, to a valve actuator which is powered or controlled by any suitable means, such as pneumatic or hydraulic fluids, electrical power or by manual operation. While the invention is particularly suitable for use with and is described in connection with a tapered plug type of poppet valve formed of "Teflon" plastic material, the valve actuator of the present invention may also be utilized with a wide variety of valves of different types.

2. Description of the Prior Art

Various types of actuators have heretofore been employed for tapered plug valves formed of "Teflon" plastic material. In general these actuators have been of the so-called impact type and do not provide a consistent closing force that is needed to insure a predictable progressive penetration and leak-tight closure of the tapered plug against the seat over the useful life of the valve. Impact actuators operate on the principle of the application of stored spring energy (usually with a normally closed valve) and pneumatic energy (usually with a normally open valve), through conversion to kinetic energy and force recovery through an anticipated deceleration rate. With these impact units pneumatic venting/pressurization rates, and piston and stem seal friction, often varying with wear, and lubrication, temperature and seal differential pressure cannot be controlled sufficiently to insure acceptable performance. Deceleration forces vary with plug alignment during seating and the depth of plug penetration into the seat. Contamination and temperature variation of the valve material further influence the final force value of seating and closing and vary widely. Impact actuators also suffer from a so-called "first cycle stick" problem wherein sliding devices (especially seals) tend to stick after being maintained in a fixed position for a long period of time.

Patents which are generally pertinent to the present invention are the Stouder U.S. Pat. No. 2,752,930, the Snyder U.S. Pat. Nos. 4,074,688 and 4,073,466, the Goehring U.S. Pat. No. 2,564,569, the Mueller U.S. Pat. No. 3,593,958 and the Weber U.S. Pat. No. 983,101.

SUMMARY OF THE INVENTION

The above-discussed disadvantages of impact type actuators for tapered plug valves are avoided in accordance with the present invention by providing a relatively high value, repeatable valve closing force which is momentarily applied to a valve plug formed of material such as "Teflon" plastic to insure positive initial insertion and progressive penetration into the valve seat, independent of manually applied force, spring force, pneumatic pressure or the rate of valve closure. After the valve plug is closed, the holding force acting on the plug to maintain it in a closed position automatically drops to a selectively controlled, lesser value, moderate holding force that positively retains the plug with ample seating pressure but low enough to minimize long term deformation or creep of the "Teflon" material of the valve poppet itself. For valve opening, the actuator of the present invention provides a high value unseating force to positively withdraw the plug and fully open the valve.

OBJECTS OF THE INVENTION

It is, therefore, an object of the present invention to provide a new and improved valve actuator wherein a high value, accurately repeatable closing force is momentarily applied to a valve poppet, and after closure, the force on the poppet is automatically reduced to a lower value which is sufficient to maintain the valve poppet tightly sealed, but is low enough to minimize any substantial deformation of the valve poppet material.

It is another object of the present invention to provide a new and improved valve actuator for a poppet type valve which is capable of producing an accurately repeatable, high initial closing force on a valve poppet followed by a reduced and selectively controlled holding force for long term retention of the valve in a closed position.

It is a further object of the present invention to provide a new and improved valve actuator which can be economically manufactured and which provides a highly reliable and repeatable closure force for a tapered plug type valve poppet formed of plastic material such as "Teflon."

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 1 is a sectional side elevational view of a valve actuator according to the present invention for use in connection with a normally open tapered plug type valve;

FIG. 2 is a view similar to FIG. 1 but showing the valve in the position in which a high value, initial closing force is applied to the tapered valve plug;

FIG. 3 is a view similar to FIG. 1 but showing the valve actuator in a position wherein a reduced holding force is applied to the fully seated tapered valve plug.

DESCRIPTION OF THE PREFERRED EMBODIMENT

Figure 4:
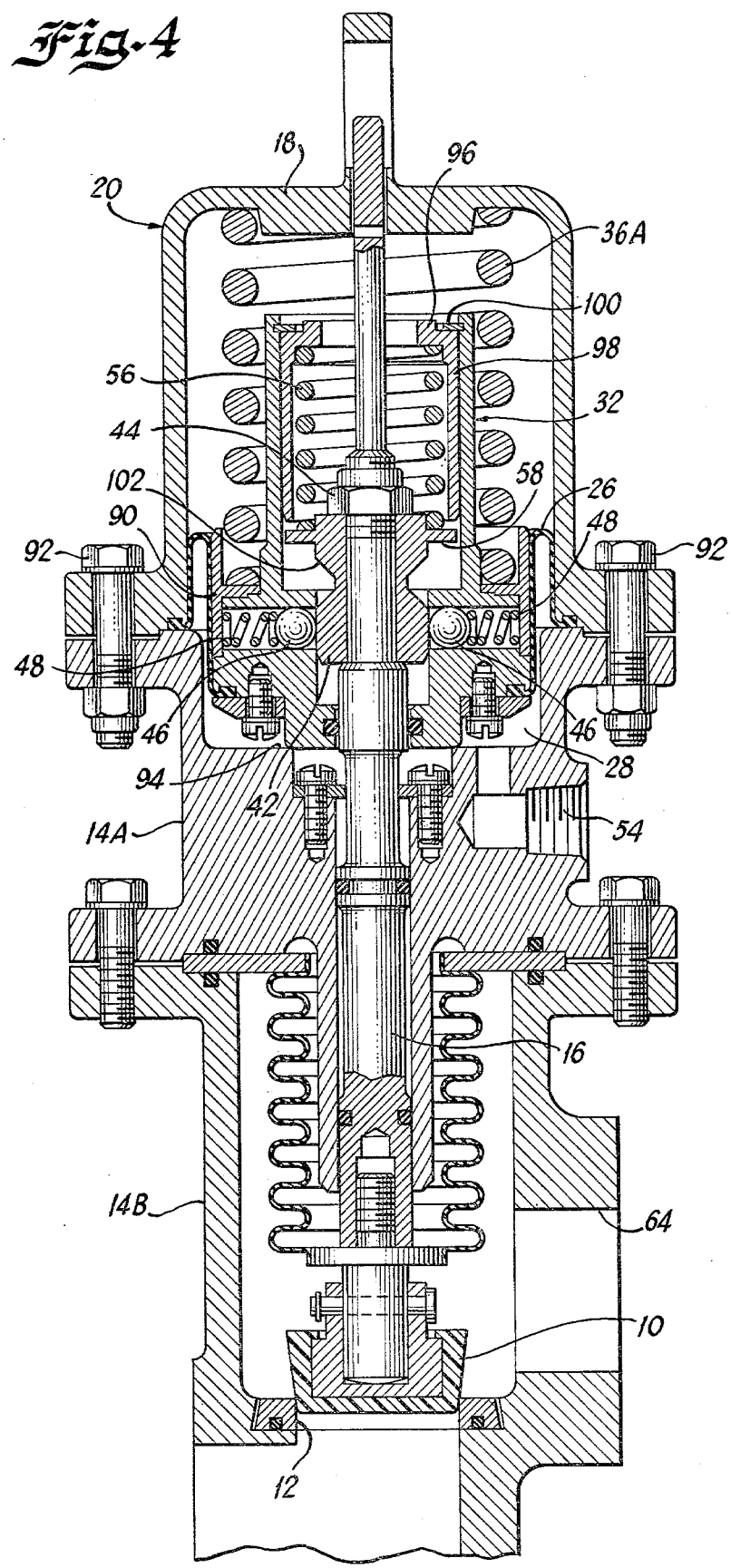
FIG. 4 is a cross-sectional view of an alternative arrangement of the present invention for a normally closed, tapered plug type valve poppet.

Referring now to FIGS. 1 to 3 of the drawings, the present invention is therein illustrated in connection with a poppet valve having a frustoconically tapered plug 10 preferably formed of "Teflon" plastic material and adapted to be seated against an annular valve seat 12 formed at the lower end of a housing, which is indicated generally at 14. The valve poppet 10 is connected to one end of an elongated valve stem 16 which is journaled for sliding longitudinal movement along the central axis of the housing 14. The upper end of the valve stem 16 extends through a top or upper end wall 18 of an upper housing section 20 secured to the lower housing 14. Both housings 14 and 20 are provided with outwardly extending annular flanges or lips 22 and 24 between which is secured an outer edge portion of a flexible diaphragm 26. The lips 22 and 24 are sealed together in a suitable manner to provide a control chamber 28 and a lower chamber 30 which are separated by means of the flexible diaphragm 26.

The actuator mechanism for the poppet 10 includes a piston indicated generally at 32 and the piston includes a downwardly extending annular skirt 34 which is adapted to receive and contain the upper end of a main actuating spring 36. The opposite end of the spring is seated in the bottom of an annular recess 38 formed in an intermediate transverse wall of the housing 14.

The valve stem 16 is formed with an annular shoulder 40 defined between upper and lower sections and the surface of the shoulder supports a sleeve 42 retained on the valve stem 16 by a nut 44 threaded onto the upper end section. The valve stem 16 and actuator 32 are interconnected by means of a detent assembly comprising a plurality of balls 46 positioned equilaterally around the outer periphery of the sleeve 42 and biased into corresponding conically shaped recesses in the outer surface of the sleeve by radially positioned coil springs 48. When the balls 46 are seated in the conical recesses of the sleeve 42 as in FIGS. 1 and 2, the stem 16 and sleeve are locked together and move in unison. When the balls are not seated in the recesses as shown in FIG. 3 the stem 16 may slide relative to the sleeve 42 in the central bore thereof.

The inner edge of the annular flexible diaphragm 26 is sandwiched between an annular holding plate 50 and an intermediate radial wall 52 of the actuator 32 so as to provide a sealed actuating pressure chamber 28 into which fluid may be admitted under pressure through an inlet passage 54 in the wall 18 in order to close the valve. A coil spring 56 for providing a reduced value holding force for maintaining the valve in a closed condition after initial seating is mounted between an outwardly extending radial flange 58 on the upper end of the sleeve 42 and a top wall 60 of an upwardly extending cup-like portion 62 on the actuator 32.

In order to shield the lower end of the stem 16 from fluid which may be corrosive that is flowing through the opened valve between the valve seat 12 and a port 64 on a sidewall of the valve chamber, a flexible bellows 66 is provided to seal between the valve member and the actuator mechanism thereof. The bellows 66 is connected to an outwardly extending flange portion 68 at the lower end of the valve stem 16 and the top of the bellows is sealed to a flange portion 70 of the housing 14. In addition, an O-ring 72 is mounted in a groove in the lower end portion of the stem to seal between the valve stem and the bore in contact therewith. An upper end 74 of the valve stem 16 is sealed in sliding engagement with a bore formed in the upper end wall 18 of the housing section 20, and an O-ring 76 is mounted in a groove in an upper portion of the valve stem for this purpose.

Considering now the principles of operation of the positive force poppet valve actuator of the present invention, when the valve is open (FIG. 1), the main actuator spring 36 moves the actuator piston 32 upwardly until the top end wall 60 engages the under side of the upper end wall 18 of the upper housing 20. In this position, the holding spring 56 forces the radial flange portion 58 on the valve stem 16 into engagement with the radial intermediate wall 52 of the actuator 32 so that the balls 46 are seated within their respective recesses in the tubular body of the sleeve 42.

When the pressurized fluid is now admitted to the control chamber 28 no downward movement of the valve stem 16 is produced until the fluid pressure within the chamber 28 produces a downward force on the actuator 32 that exceeds the upward force of the main actuator spring 36. However, as soon as the fluid pressure force in the control chamber 28 is sufficient to overcome the upward force of the spring 36, the actuator 32 begins to move downwardly and because the valve stem 16 is positively interlocked with the actuator 32 by means of the balls 46 seated in their respective recesses as a detent mechanism, the poppet 10 is moved downwardly into closing engagement with the annular seat 12 to the closed or seated position as shown in FIG. 2. As the fluid pressure continues to build up in the chamber 28 an increasing seating force is exerted on the poppet 10 to insure positive seating in the valve seat 12. This seating force continues to increase until the detent mechanism functions to disconnect the actuator 32 from the valve stem 16 as the balls 46 are moved radially outward from their respective recesses. When this occurs, the actuator 32 is slidable and moves downwardly with respect to the valve stem 16. The balls 46 ride along the outer surface or periphery of the sleeve 42 until the bottom edge of the actuator skirt 34 is moved into engagement with an annular stop surface or shoulder 80 formed on an intermediate transverse wall of the housing 14, as shown in FIG. 3.

As soon as the actuator 32 is disconnected from the valve stem 16 and the skirt 34 moves downwardly into engagement with the shoulder 80, the force tending to hold the poppet 10 against the seat 12 is reduced to a lower value that is provided by the auxiliary holding spring 56 even though the fluid pressure in the control chamber 28 continues at a high value which originally caused the detent mechanism to disconnect the actuator 32 from the valve stem 16.

After seating, the valve poppet is retained in the closed position by a reduced holding force substantially less than the value of the force used to initially close or seat the tapered poppet 10. Long term deformation and/or creep or cold flow of the material of the poppet 10 is prevented or greatly reduced by the reduced holding force provided by the spring 56 and this permits excellent sealing action to be achieved even though the normally open valve may be closed for extended periods of time.

In this connection it is pointed out that the force with which the poppet 10 is initially seated on the seat 12 is accurately controlled and limited by the detent mechanism rather than the main actuator spring 36. If, for example, it is desired to initially seat the poppet 10 with a force of from sixty to eighty pounds, the springs 48 are sized so that the balls of the detent mechanism will move out of the recesses to release the sleeve on the stem at this value of seating force exerted on the stem.

Under these assumed conditions, the main actuator spring 36 may exert a force of forty pounds on the stem, but this only means that the actuator 32 will not start moving downwardly from the position shown in FIG. 1 toward the position shown in FIG. 2 until the fluid pressure in the control chamber 28 overcomes the spring force. However, the pressure in the chamber 28 may continue to rise to exert a seating force of sixty to eighty pounds for seating the poppet 10 in the annular valve seat 12, and this force value may occur before the detent mechanism disengages the actuator 32 from the valve stem 16 and moves the actuator to the position shown in FIG. 3. When the actuator moves to the position shown in FIG. 3.

When the actuator moves to the position shown in FIG. 3, the holding force with which the poppet 10 is retained on the seat 12 is reduced to a value of twenty to thirty pounds which is exerted by the holding spring 56. At this lower force value, cold flow of the "Teflon" poppet 10 is prevented or eliminated even though the valve is retained in the closed position over long periods of time.

In order to open the valve poppet 10, the port 54 is vented to atmosphere, and the pressure in the chamber 28 is reduced until the force of the main actuator spring 36 is sufficient to move the actuator 32 upwardly so that the detent mechanism again interconnects the actuator 32 with the valve stem 16. After the balls are seated, the poppet 10 is withdrawn from the seat 12 to open the valve. With this arrangement, a high value plug unseating force is provided to positively withdraw the plug 10 and fully open the valve.

In FIG. 4 is illustrated an alternative embodiment of the present invention which is suitable for controlling a normally closed tapered plug type of poppet valve. In this embodiment, identical reference numerals have been used for corresponding elements of the embodiment heretofore described in connection with FIGS. 1 to 3.

Referring to FIG. 4, a normally closed valve of this embodiment is generally similar to the normally open valve heretofore described. However, in the latter embodiment, a main actuator spring 36A is positioned between the top wall 18 of the upper housing 20 and a radial flange insert 90 which forms a part of the actuator 32. Also, the housing 14 is formed in two separate pieces comprising an intermediate housing 14A which is secured to the upper housing 20 by means of the bolts 92 and a lower housing 14B which is similarly secured to the housing portion 14A.

The actuator spring 36A normally forces the actuator 32 downwardly until a lower end is in stopped engagement with a shoulder 94 formed at the end wall of the housing 14A. A ball detent assembly with a plurality of balls 46 normally seated in recesses of a sleeve 42 act to interlock the actuator 32 and the valve stem 16 together during closing and a low value holding force is exerted on the poppet 10 when closed by means of an auxiliary holding spring 56. The spring 56 is positioned between a flange 58 of the actuator sleeve 42 and an upper end wall 96 of a tubular guide sleeve 98 which is restrained from upward movement by a retaining ring 100.

When it is desired to open the valve, pressurized fluid is introduced in the control chamber 28 through the port 54, and when the fluid pressure exerts a large enough force to overcome the force exerted on the spring 36A, the actuator 32 is moved upwardly until the balls 46 are seated in the recesses 102 provided in the sleeve 42. At this time, the actuator 32 becomes positively interlocked with the valve stem 16 and provides a high value plug unseating force which is capable of unseating and withdrawing the poppet 10 away from the seat 12. The actuator stem and valve 10 move farther upwardly after unseating until an upper end of the actuator 32 engages the top wall 18 of the housing 20. The actuator is continuously held in this position as long as the fluid pressure in the chamber 28 exceeds the force of the spring 36A.

When the valve 10 is to be closed, fluid in the chamber 28 is vented to atmosphere through the port 54 and when the fluid pressure in the chamber 28 is sufficiently low, the spring 36A then is able to force the actuator 32 and valve stem 16 combination downwardly so that the poppet 10 is positively seated on the seat 12.

The normally closed valve of FIG. 4 is provided with a spring 36A having a force sufficiently great to overcome the interlocking forces of the detent mechanism including the sleeve 42, balls 46 seated in the recesses 102 and biased by the springs 48'. As an example, if the valve 10 is to be closed or seated with a force ranging from sixty to eighty pounds, the actuator spring 36A must develop a force which exceeds this amount so that the detent mechanism will disconnect the actuator 32 from the valve stem 16 and permit the actuator 32 to move into stopping engagement with the shoulder 94. After this occurs a lower value holding force exerted by the spring 56 on the valve is sufficient to retain the valve closed in the seat 12 without causing excessive cold flow of the material of the valve poppet.

From the foregoing description it will be seen that in both the normally open and normally closed embodiments of the present invention, a high value and accurately repeatable seating or closing force is momentarily applied by the actuator to the valve poppet. This force value is determined by the detent mechanism including the sleeve 42, the balls 46 and spring 48 and insures positive insertion and progressive penetration of the poppet in the valve seat independently of a manually applied force, a spring biasing force, pneumatic or fluid pressure force or the rate of valve closure. After valve closure, the force acting to maintain the plug in a seated or closed condition is automatically dropped to a controlled moderate holding force that is less than the initial closing force but sufficient to positively retain the plug with ample sealing pressure against the seat to prevent fluid leakage. This seating or holding pressure is low enough to minimize any long term deformation or cold flow of the material of the plug, particularly if the material is a plastic resin such as "Teflon" brand material. For valve opening, the actuator provides a high value plug unseating or opening force to positively withdraw the plug and fully open the valve. In this connection it will be understood that while the present invention has been illustrated in connection with a frustoconically tapered plug type of poppet valve formed of "Teflon" resin, the actuator of the present invention may be used with other styles of poppets where a repeatable, high value initial closing force is desired followed by a reduced value and selectively controlled holding force for maintenance of the valve in a closed position for long term retention.

While the arrangement of the present invention is particularly adapted for control by pneumatic or hydraulic pressurized fluids, it will be appreciated that other forms of power may be employed to control movement of the valve stem. For example, the valve stem 16 may be directly actuated by an electrically operated solenoid or an electric motor, in which case the diaphragm 26 may be eliminated. Also, the valve stem 16 may be manually operated through any suitable type of direct acting linkage or mechanism, insofar as the present invention is concerned.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A poppet valve actuator, comprising an actuator housing, a poppet having a valve stem slidably mounted in said housing and cooperating with a valve seat, an actuator mounted in said housing coaxially with said valve stem and movable with respect thereto, detent means interconnecting said valve stem and said actuator so that they move together first means for biasing said actuator to a first position in which the poppet valve is open, means for moving said actuator against the force of said first biasing means in the direction to seat said poppet on said valve seat, said detent means acting to disconnect said actuator from said valve stem after said poppet has been seated on said valve seat with a predetermined initial seating force while said actuator continues to move in said direction, and second biasing means operative after said detent means has disconnected said actuator from said valve stem for holding said poppet against said valve seat with a predetermined holding force which is substantially less than said initial seating force which is exerted on said poppet at the time said detent means disconnects said actuator from said valve stem.

2. The poppet valve actuator of claim 1, which includes stop means for limiting travel of said actuator in said direction.

3. The poppet valve actuator of claim 2, wherein said second biasing means comprises a spring positioned between said actuator and said valve stem and compressed to provide said holding force when said actuator is in engagement with said stop means.

4. The poppet valve actuator of claim 1, which includes a diaphragm interconnecting said actuator and said housing to define therewith a control chamber, and means for admitting pressurized fluid to said control chamber, thereby to move said actuator in said direction.

5. The poppet valve actuator of claim 1, wherein said actuator comprises a piston having a skirt portion facing one end of said housing, and said first biasing means comprises a coil spring positioned within said skirt portion of said piston and engaging said one end of said housing.

6. A poppet valve actuator, comprising an actuator housing having a cylindrical control chamber therein, piston means movably mounted within said control chamber, means for admitting pressurized fluid into said control chamber to move said piston means in one direction therewithin, a normally open poppet having a valve stem connected to said piston means and movable into engagement with a valve seat when said piston means is moved in said direction, detent means interconnecting said valve stem and said piston means so that they move together, said detent means acting to disconnect said piston means from said valve stem when said poppet has been seated on said valve seat with a predetermined initial seating force while said piston means continues to move in said one direction due to the force exerted thereon by said pressurized fluid, stop means for limiting movement of said piston means in said one direction after said valve stem has been disconnected therefrom, and spring means operative during periods when said piston means is held against said stop means by said pressurized fluid for holding said poppet against said valve seat with a predetermined holding force which is substantially less than said initial seating force.

7. The poppet valve actuator of claim 6, which includes a main actuator spring positioned between said piston means and said housing and biasing said poppet away from said valve seat with a force which must be overcome by said pressurized fluid in order to move said piston means in said direction.

8. The poppet valve actuator of claim 7, wherein said valve stem is provided with a transversely extending flange and said holding means comprises a coil spring positioned between said flange and said piston means.

9. The poppet valve actuator of claim 8, wherein said main actuator spring urges said piston means into engagement with said flange in the absence of pressurized fluid in said control chamber.

10. The poppet valve actuator of claim 9, wherein said disconnecting means comprises a recess in said valve stem, a ball carried by said piston means and seated in said recess when said piston means is in engagement with said flange, and spring means positioned transversely of said valve stem and carried by said piston means for urging said ball into said recess with a predetermined force.

11. The poppet valve actuator of claim 8, wherein said coil spring is positioned between an end wall of said piston means and said flange, said main actuator spring acting to hold said end wall of said piston means against one end wall of said control chamber in the absence of pressurized fluid in said control chamber.

12. The poppet valve actuator of claim 6, wherein said disconnecting means comprises a recess in said valve stem, a ball carried by said piston means and seated in said recess, and spring means for urging said ball into said recess with a predetermined force, said ball being forced out of said recess to permit relative movement between said piston means and said valve stem when the pressure of fluid in said control chamber exceeds a predetermined value.

13. A poppet valve actuator, comprising an actuator housing, a poppet having a valve stem slidably mounted in said housing and cooperating with a valve seat, an actuator mounted in said housing coaxially with said valve stem and movable with respect thereto, detent means interconnecting with said valve stem and said actuator when said poppet is positioned away from said valve seat so that said valve stem and actuator move together, means for moving said actuator in the direction to seat said poppet on said valve seat, said detent means being operative to disconnect said actuator from said valve stem when said moving means has seated said poppet on said valve seat with a predetermined initial seating force while said actuator continues to move in said direction, and spring means operative after said actuator has been disconnected from said valve stem for holding said poppet against said valve seat with a predetermined holding force which is substantially less than said predetermined initial seating force.

14. The poppet valve actuator of claim 13, wherein said detent means comprises an inwardly extending recess in said valve stem, a member carried by said valve actuator and adapted to be positioned in said recess, and spring bias means also carried by said valve actuator for urging said member into said recess with a predetermined force which must be overcome by said moving means in order to disconnect said valve actuator from said valve stem.

15. The poppet valve actuator of claim 13, wherein said moving means comprises a coil spring positioned between said actuator and said housing.

16. The poppet valve actuator of claim 13, wherein a coil spring is positioned between said actuator and said housing to hold said valve stem with said poppet spaced away from said valve seat, and said moving means comprises means for introducing fluid under pressure into said housing to move said actuator in said direction against the force of said coil spring.

17. The poppet valve actuator of claim 13, which includes means defining a stop for limiting movement of said actuator in said direction, a coil spring positioned between said actuator and said housing for holding said actuator against said stop when said actuator is disconnected from said valve stem, and means for introducing fluid under pressure into said housing to move said actuator away from said stop against the force of said coil spring, said detent means being operative to connect said actuator with said valve stem when said actuator has been moved away from said stop a predetermined amount so that said poppet is moved away from said valve seat upon continued movement of said actuator in the same direction.

* * * * *